US011540531B2

(12) United States Patent
Fratto et al.

(10) Patent No.: US 11,540,531 B2
(45) Date of Patent: Jan. 3, 2023

(54) DEVICE AND METHOD FOR DEGASSING GRANULAR OR POWDER MATERIAL AND THE USE OF A BLOWER ELEMENT FOR DEGASSING SAID MATERIAL

(71) Applicant: NTE HOLDING S.R.L., Gorgonzola (IT)

(72) Inventors: Emanuele Fratto, Gorgonzola (IT); Fabio Novelli, Gorgonzola (IT); Massimo Congedi, Gorgonzola (IT)

(73) Assignee: NTE HOLDING S.R.L., Gorgonzola (IT)

( * ) Notice: Subject to any disclaimer, the term of this patent is extended or adjusted under 35 U.S.C. 154(b) by 264 days.

(21) Appl. No.: 16/766,777

(22) PCT Filed: Jul. 30, 2018

(86) PCT No.: PCT/IB2018/055668
§ 371 (c)(1),
(2) Date: May 26, 2020

(87) PCT Pub. No.: WO2019/106446
PCT Pub. Date: Jun. 6, 2019

(65) Prior Publication Data
US 2020/0315203 A1    Oct. 8, 2020

(30) Foreign Application Priority Data

Nov. 29, 2017  (IT) .......................... 102017000137278

(51) Int. Cl.
*A23F 5/10* (2006.01)
*A23F 5/16* (2006.01)
(Continued)

(52) U.S. Cl.
CPC ................ *A23F 5/105* (2013.01); *A23F 5/16* (2013.01); *A23F 5/36* (2013.01); *A23L 3/3409* (2013.01)

(58) Field of Classification Search
CPC ..................................................... A23L 3/3409
See application file for complete search history.

(56) References Cited

U.S. PATENT DOCUMENTS 3,261,689 A * 7/1966 Ponzoni .................. A23F 5/405
426/310
5,958,156 A * 9/1999 Kemp ........................ C22B 5/14
75/363

(Continued)

FOREIGN PATENT DOCUMENTS

CN  203529174    *  4/2014
CN  104176286    * 12/2014
(Continued)

OTHER PUBLICATIONS

English Translation for JP2006314329 published Nov. 2006.*
(Continued)

*Primary Examiner* — Anthony J Weier
(74) *Attorney, Agent, or Firm* — Shuttleworth & Ingersoll, PLC; Timothy J. Klima

(57) ABSTRACT

A device and related degassing method for granular or powder material and the use of a blower element, wherein a containment chamber of the granular or powder material and of a gas produced by said material is provided, means for supplying an injection gas with the gas produced by the material having the blower element for feeding the injection gas into said chamber for mixing and/or homogenizing the material and the relative gas produced by the material itself with the injection gas.

6 Claims, 3 Drawing Sheets

(51) Int. Cl.
    *A23F 5/36*           (2006.01)
    *A23L 3/3409*       (2006.01)

(56) References Cited

U.S. PATENT DOCUMENTS

| | | | |
|---|---|---|---|
| 11,325,082 B2* | 5/2022 | Congedi | B01F 33/4062 |
| 2009/0205364 A1* | 8/2009 | Enis | B01D 7/02 62/604 |
| 2015/0140184 A1 | 5/2015 | Fu et al. | |

FOREIGN PATENT DOCUMENTS

| | | | |
|---|---|---|---|
| DE | DD202993 | * | 10/1981 |
| EP | 1832620 A1 | | 9/2007 |
| EP | 2048464 A2 | | 4/2009 |
| FR | 2225095 | * | 11/1974 |
| JP | 2006314329 | * | 11/2006 |

OTHER PUBLICATIONS

English Translation for FR2225095 published Nov. 1974.*
English Translation for CN 104176286 published Dec. 2014.*
English Translation for CN203529174 published Apr. 2014.*
English Translation for DD202993 published Oct. 1981.*
International Search Report dated Sep. 17, 2018 from counterpart PCT App No. PCT/IB2018/055668.

* cited by examiner

DEVICE AND METHOD FOR DEGASSING GRANULAR OR POWDER MATERIAL AND THE USE OF A BLOWER ELEMENT FOR DEGASSING SAID MATERIAL

This application is the National Phase of International Application PCT/IB2018/055668 filed Jul. 30, 2018 which designated the U.S.

This application claims priority to Italian Patent Application No. 102017000137278 filed Nov. 29, 2017, which application is incorporated by reference herein.

The present invention relates to a device and a method for degassing granular or powder material and the use of a blower element for degassing said material.

In particular, the present invention relates to a device and relative method for promoting the action of removing a gas produced from a granular or powder material. The object of the present invention is also the use of a blower element for the removal of the aforementioned gas produced by the material.

As known, the degassing operations, typically used in the food industry for to remove carbon dioxide before the respective steps of packaging or subsequent treatment, are carried out using a passive expulsion system promoted by an inert gas.

In greater detail, in the case of food products in granular form or powder, such as coffee powder, the degassing step is carried out by storing the food material in appropriate silos and injecting inert gas into the base of the silos. The migration of the gas produced/released from the coffee powder (carbon dioxide) towards the outside is then carried out in the silo.

As aforementioned, this step occurs in a "passive" manner, that is to say, awaiting the complete reaction of the gases.

This implies important drawbacks which make this known technique problematic in terms of production costs of the material to be degassed.

It should be noted, as a matter of fact, that within a powder or granular product packaging line, the awaiting of the action which causes the expulsion of carbon dioxide turns out to be very long and determines a major slow down step of the production process.

Therefore, the whole production line turns out to be very slow with the consequent disadvantages in terms of total production costs of the product.

It should also be considered that within the aforementioned production processes, in order to process large amount of raw material, numerous silos must be provided for the degassing step only.

This causes a further drawback deriving from the overall dimensions of the silos wherein the product is stationed upstream of the packaging step.

In this context, the technical task underlying the present invention is to propose a device and a method for degassing granular or powder material and the use of a blower element for degassing said material, which overcome the drawbacks of the aforementioned known art.

In particular, it is an object of the present invention to reduce the waiting steps of the degassing operations, in order to speed up the whole production process of the granular or powdered material.

In greater detail, the object of the present invention is to make the degassing step "active" promoting the migration of gases inside the silo.

A further object of the present invention is to make the device and the degassing method versatile, adapting it according to any type of granular or powder material which must undergo this process.

Finally, an object of the present invention is to provide a structurally simple degassing device having particularly low costs and being particularly small to avoid the use of great number of silos, and at the same time capable of removing the gas produced by great amount of material.

The technical task described and the object stated are substantially achieved by a device and method for degassing granular or powder material and by the use of a blower element for degassing said material, comprising the characteristics disclosed in one or more of the attached claims.

Further characteristics and advantages of the present invention will become clearer from the indicative and therefore non-limiting description, of a preferred embodiment of a device and method for degassing granular or powder material and the use of a blower element for degassing said material, as illustrated in the attached drawings wherein.

Figure 1:
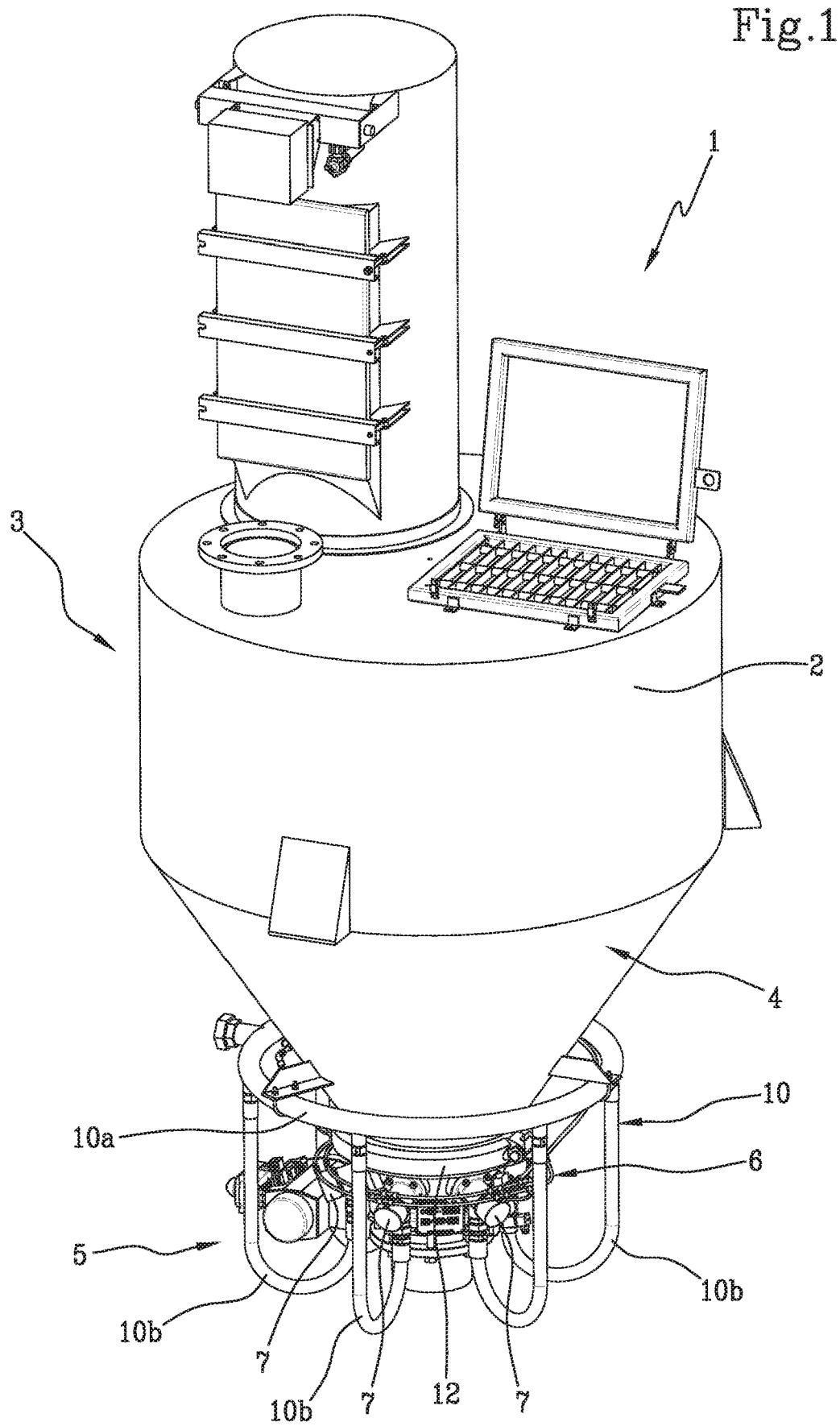
FIG. 1 shows a perspective and schematic view of a device for degassing granular or powder material according to the present invention.

With reference to the attached figures, reference number 1 globally indicates a device for degassing granular or powder material.

It should be specified that the present invention finds particular application in granular or powder material of any type, which requires a degassing step aimed at removing any gas produced by this material.

Therefore, during the present discussion, general reference will be made to material of any type and having different particle size (powder or granular).

However, the applicant has found that the present invention finds advantageous application in the food industry, to remove powder or granular gases generated by food products.

By way of non-limiting example, reference should be made to the coffee powder which needs a degassing step to remove the carbon dioxide produced by the coffee itself downstream of the respective packaging step.

The device 1 comprises a chamber 2 suitable for containing the granular or powder material and the gas produced by the material itself.

Preferably, according to the present invention, the chamber 2 is defined by a silo 3, therefore having a substantially cylindrical configuration with a respective flaring profile bottom portion 4.

In other words, the bottom portion 4 of the silo 3 has a laterally flaring side wall downward having a substantially frusto-conical shape.

The size and shape of the silo 2 can be of any type depending on the various production needs and depending on the type of material to be degassed.

The silo 3 has on its top respective openings for feeding the material and for evacuating the gases not described and illustrated in detail since they are of a known type.

The device 1 further comprises means 5 for supplying an injection gas which replaces in the atmosphere the gas produced by the material.

Advantageously, the means 5 comprise at least one blower element 6, preferably of a pneumatic type, for feeding of the injection gas into the chamber 2.

In this way, the blower element 6 feeds the injection gas and consequently mixes and/or homogenizes the injection gas with the material and the respective gas produced by the material itself.

In other words, the gas fed by the blower element defines a turbulent flow inside the chamber 2 to mix and homogenize the material itself. This action promotes and accelerates the action of gases with the consequent evacuation of the gas produced by the material.

The blower element 6 is advantageously constituted by a pulse valve 7 for supplying the injection gas at a predetermined pressure and flow rate depending on the type, particle size and quantity of material to be degassed.

Furthermore, the pulse valve 7 is of the on/off type, therefore provided with a shutter 8 which, when opened at predetermined time intervals, allows the passage of the gas. Also in this case, the opening time of the shutter 8 and the sequence of pulses is determined by a suitable logic control unit (not described in detail since it is of known type) and depending on the material type and the degassing step which must be defined.

Again, preferably the valve 8 is of the type capable of being able to vary the passage section defined by the shutter 8 under open conditions. This passage section therefore determines the flow rate of gas which is inserted into the chamber 2.

In other words, the valve 7 allows to vary multiple injection gas injection parameters depending on the material to be degassed. These parameters (pressure, flow rate, number of pulses, opening time of the shutter 8) are manageable and variable by the logic unit and for each material to be degassed.

Preferably, according to the preferred embodiment of the present invention, the blower element 6 comprises a plurality of pulsed valves 7, each one operating independently to supply the injection gas into the silo 3.

In this case, the sequence of opening pulses of the single shutter 8, is determined by the logic control unit in combination with all the valves 7 and always depending on the material to be degassed and the various operating needs.

Figure 2:
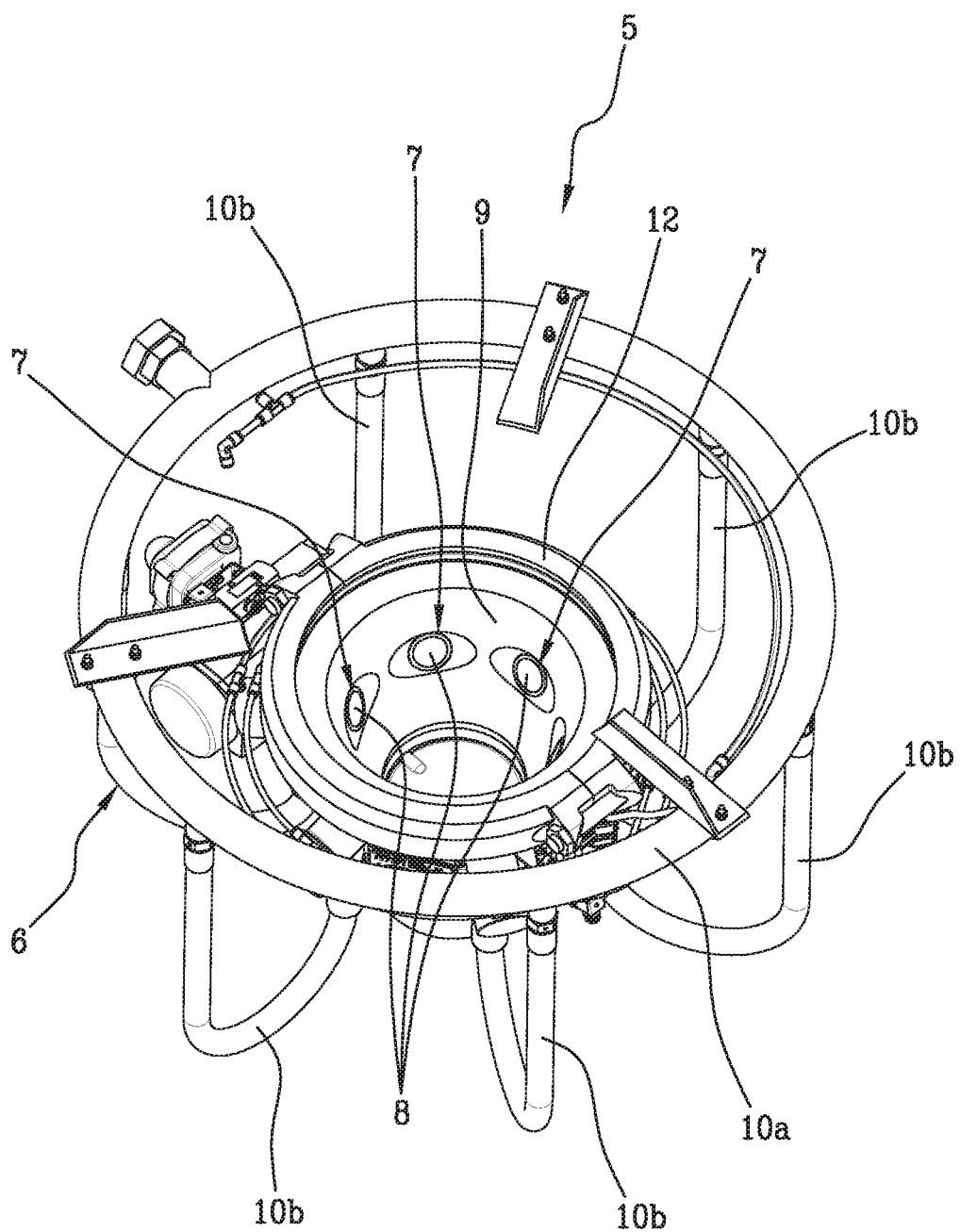
FIG. 2 shows a perspective view of a blower element according to the present invention, being part of the device of FIG. 1.
Figure 3:
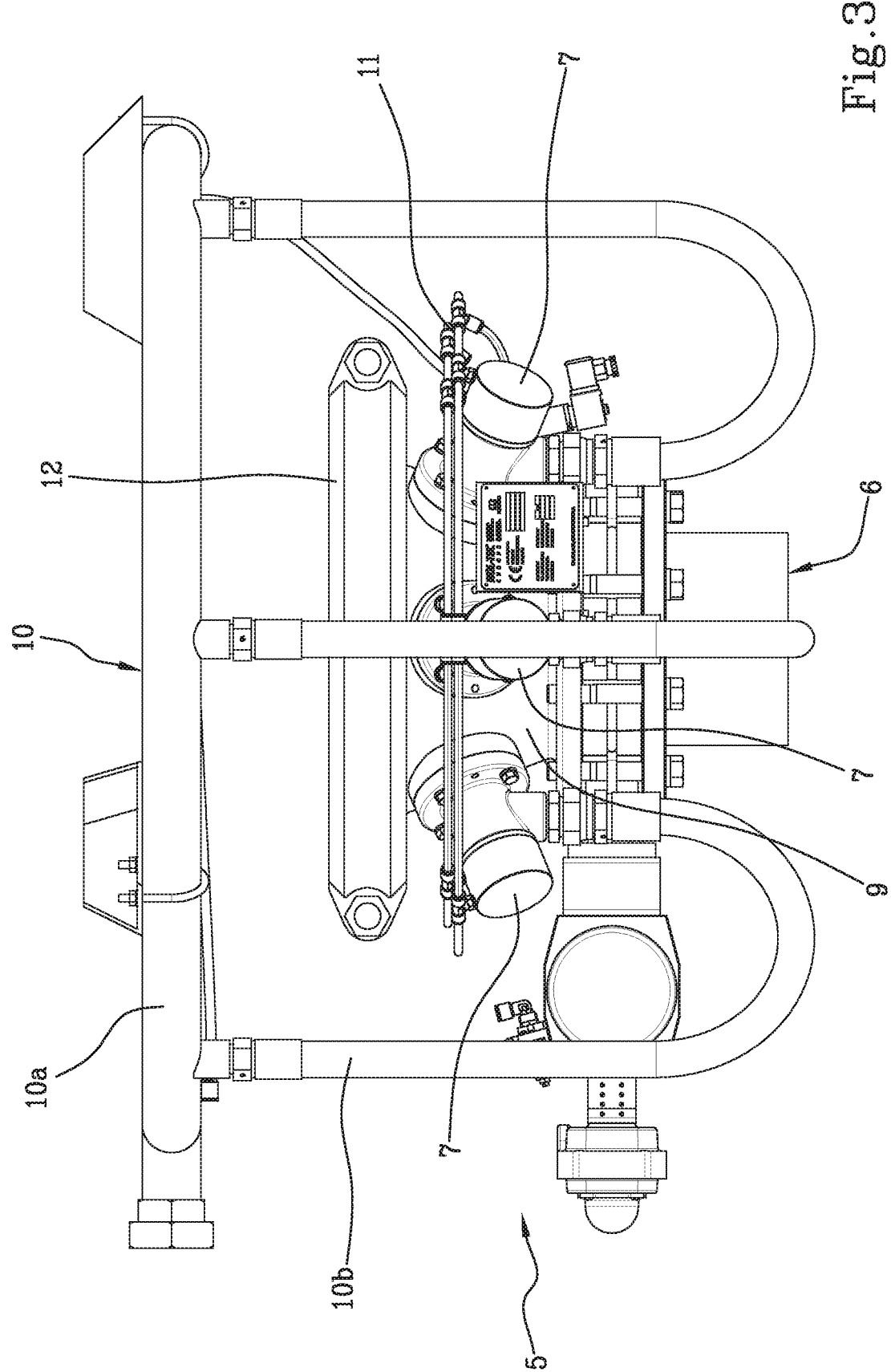
FIG. 3 shows an elevational side view of the blower element of FIG. 2.

With reference to FIGS. 2 and 3, a manifold 9 which can be associated with the bottom portion 4 of the silo 3 is provided in order to blow the injection gas from the bottom of the chamber 2.

In particular, the manifold 9 has a conical shape, also flaring towards the bottom to be associable without continuity solution to the bottom portion 4. In other words, the manifold 9 and the bottom portion 4 define in mutual collaboration a lower hopper of the respective silo 3.

The coupling of the manifold 9 to the bottom portion 4 takes place by means of a circular flange 12 suitable for joining the upper edge of the manifold to the lower edge of the bottom portion 4.

In this situation, the valves 7 are housed along a circumferential path defined by the annular manifold 9 to impart the gas towards the centre of the circumferential path.

Furthermore, the blower element comprises a duct 10 in fluid communication with all the valves 7 in order to feed the aforementioned injection gas.

The duct 10 has a first annular section 10a arranged around the manifold 9 and from which a plurality of second sections 10b develop, each one suitable for imparting the gas to the respective valve 7.

Preferably, the injection gas fed through the duct 10 is an inert gas. For example, in case of degassing food products, such as for example food powders, nitrogen is supplied by the valves 7 to react with the carbon dioxide produced by the powders.

It should however be specified that also in this case, the injection gas distributed by the valves 7 is chosen depending on the material and therefore of the gas generated from it.

Furthermore, the blower element 6 is provided with suitable pneumatic feeding systems 11 (not described in detail since they are of known type), directly connected to the pneumatic actuators of the respective valves 7 for the opening and closing movement of the shutter 8.

According to a further aspect of the invention, the device 1 can also be provided with a vacuum actuation system inside the chamber 2. This system, not described and illustrated in detail, is preferably made up of a pump associated with a compensation system so as to maintain a sufficiently low vacuum level even during the feeding of the injection gas.

The vacuum actuation system can have other technical components suitable for lowering the pressure in the chamber 2 by defining at least a partial vacuum condition.

In this situation, the migration of the gas produced by the material and determined by the feeding of the injection gas is accelerated.

The present invention also relates to a method for degassing granular or powder material, which comprises the steps of:
  providing in a containment chamber 2 the granular or powder material; and
  distributing in the containment chamber 2 the injection gas with the gas produced from the granular or powder material.

Advantageously, the step of distributing the injection gas is carried out by mixing and/or homogenizing the material with the injection gas.

The distribution of the injection gas step is carried out feeding the gas itself by means of at least a pulse valve 7 at a predetermined pressure and flow rate depending on the material.

Preferably, as specified above, the distribution of the injection gas step is carried out by a plurality of pulse valves 7, of the type described above, and according to a timed sequence of opening and closing of the respective shutters 8.

Each valve 7 then provides to alternately supply the injection gas, directing it from the bottom of the chamber 2 towards the material.

In other words, the individual gas flows emitted by the valves 7 are directed from the hopper of the silo 3 towards the material in order to create a turbulent motion of the granular or powder material.

Said action determines the mixing and/or homogenization of the material and of the gas produced by it with the inert gas, thus promoting the degassing operation.

Advantageously, in this way, the mixing action imparted by the blower element 6 speeds up the removal of the gas produced by the material, thus avoiding storage and waiting for the "passive" action of the gases.

Furthermore, prior to the distributing of the injection gas step into the containment chamber 2, a further step of reducing the pressure in the chamber 2 can be carried out to determine at least a partial vacuum condition.

In this way, the feeding of the injection gas and the mixing and/or homogenization step and the consequent migration of the gas produced by the material is carried out in said vacuum condition.

The present invention relates finally to the use of the blower element 6 for degassing granular or powder material, of the type described above in a purely structural sense and in its operation.

The blower element 6 is advantageously coupled to a respective silo wherein the granular or powder material is contained which produces the gas to be removed.

The coupling of the blower element 6 with the respective silo is carried out by means of the aforementioned circular flange 12 which allows to associate the manifold 9 to the bottom portion 4 of the silo 3.

In this way, particularly in the specific case of the treatment of granular or powder food products, the blower element 6 allows to mix and/or homogenize the product and the carbon dioxide generated by the product itself by means of pressure feeding of an inert gas (e.g. nitrogen).

The present invention achieves the intended objects and achieves important advantages.

Firstly, as disclosed above, the pressure emission of the injection gas carried out by the blower element 6 eliminates the "passive" waiting steps typical for the degassing operations.

In fact, the turbulent action of the injected gas carries out the mixing and/or homogenization of the material allowing to accelerate and promoting the action of the gases thus removing the gas produced by the material in a very short time.

As a result, all the steps of the production process of the granular or powder material are speeded up, including the subsequent packaging step of the same.

In addition, by means of the actuation of the vacuum condition inside the chamber 2 it is possible to further reduce the migration times of the gas produced by the material.

A further advantage of the present invention is given by the extreme versatility of the device 1 able to adapt to the type of material to be degassed, thus optimizing the times for removing the gas produced by the material.

This versatility is conferred by the valves 7 which allow to regulate the operating parameters for the emission of the gas. These parameters consist of the pressure and the flow rate of the gas due to the passage section determined by the stroke of the shutter 8 during the opening phase. Also the supply times, both during the opening phase of the shutter 8, and in terms of the sequence of pulses, are regulated depending on the material.

Accordingly, the present invention is applicable for the degassing of any type of granular or powder material by suitable regulation of said parameters.

Furthermore, another important advantage of the present invention is given by the simple structure of the device 1 and of the degassing method.

As a matter of fact, carrying out an "active" removal step of the gas produced by the material, allows the use of a very limited number of silos, with the same amount of material, compared to the number of silos necessary for the "passive" degassing steps.

Therefore, the device 1 and relative degassing method allow to consistently limit the overall dimensions deriving from the presence of the silos.

The invention claimed is:

1. A device for degassing granular or powder material, comprising:
    a silo defining a containment chamber for granular or powder material and a gas produced by said material and having a flaring bottom portion; and
    a supply device for supplying an injection gas, the supply device including a blower element for feeding the injection gas into said containment chamber arranged in correspondence to the flaring bottom portion to mix and/or homogenize the material and the related gas produced by the material with the injection gas;
    wherein the blower element is pneumatic and comprises a plurality of pulse valves for supplying the injection gas at predetermined pressure and flow rate values and at predetermined intervals; the pulse valves being arranged along a circumferential path defined on the flaring bottom portion.

2. The device according to claim 1, wherein said injection gas is an inert gas.

3. A method for degassing granular or powder material, comprising the steps of:
    providing in a containment chamber said granular or powder material; and
    releasing into the containment chamber an injection gas by mixing and/or homogenizing the material with the injection gas;
    wherein said step of releasing the injection gas is carried out by supplying the injection gas through a plurality of pulse valves at predetermined pressure and flow rate values as a function of the material and according to a timed opening and closing sequence of the pulse valves determined as a function of the material.

4. The method according to claim 3, wherein said step of releasing the injection gas is carried out by directing the injection gas from a bottom of the containment chamber and toward the material.

5. The method according to claim 3, wherein said injection gas is an inert gas.

6. The method according to claim 3, and further comprising, prior to the step of releasing the injection gas, a step of reducing a pressure in the containment chamber to provide at least a partial vacuum condition.

\* \* \* \* \*